(12) United States Patent
Yamada (10) Patent No.: US 7,320,640 B2
(45) Date of Patent: Jan. 22, 2008

(54) GAME SOFTWARE AND GAME MACHINE

(75) Inventor: Nobuhiro Yamada, Tokyo (JP)

(73) Assignee: Konami Corporation, Tokyo (JP)

( * ) Notice: Subject to any disclaimer, the term of this patent is extended or adjusted under 35 U.S.C. 154(b) by 645 days.

(21) Appl. No.: 10/887,380

(22) Filed: Jul. 8, 2004

(65) Prior Publication Data

US 2005/0107147 A1    May 19, 2005

(30) Foreign Application Priority Data

Nov. 14, 2003 (JP) ............................. 2003-384889

(51) Int. Cl.
*A63F 9/24* (2006.01)
(52) U.S. Cl. ....................................................... 463/11
(58) Field of Classification Search ................ 273/236, 273/237, 255, 268, 281; 463/11
See application file for complete search history.

(56) References Cited

U.S. PATENT DOCUMENTS

| | | | | |
|---|---|---|---|---|
| 4,572,514 A | * | 2/1986 | Aponte | 273/255 |
| 6,270,411 B1 | * | 8/2001 | Gura et al. | 463/20 |
| 6,419,584 B1 | * | 7/2002 | Sakamoto et al. | 463/43 |
| 7,000,918 B1 | * | 2/2006 | Tan | 273/146 |
| 2003/0085520 A1 | * | 5/2003 | Bedford et al. | 273/255 |
| 2003/0109299 A1 | * | 6/2003 | Reizei et al. | 463/11 |
| 2004/0046319 A1 | * | 3/2004 | Merritt, III | 273/236 |
| 2004/0242293 A1 | * | 12/2004 | McWilliams | 463/9 |

FOREIGN PATENT DOCUMENTS

| | | |
|---|---|---|
| JP | 2000-157744 A | 6/2000 |
| JP | 2000-167239 A | 6/2000 |
| JP | 2002-066133 | 3/2002 |

* cited by examiner

*Primary Examiner*—Robert E Pezzuto
(74) *Attorney, Agent, or Firm*—Duane Morris, LLP (57) ABSTRACT

Game software for raising interest on a card game by adding an unexpected element thereto without losing fun of thinking out a strategy. After determining an appearing face of a dice by a procedure of determining face in a turn for a player, a card attached to the determined face, which was selected from a hand by the player is determined as a battle card by a procedure of processing card battle. Offense/defense data of the battle card is read out so as to judge an outcome of the battle cards. The player is invited to freely select the card to be attached to each face of the dice from the hand, and the dice card corresponding to an appearing face is used as the battle card.

6 Claims, 8 Drawing Sheets

GAME SOFTWARE AND GAME MACHINE

BACKGROUND OF THE INVENTION

The invention relates to game software for a card game and, more particularly, to game software for improving a fun of a card game by adding an unexpected element thereto without losing a fun of thinking out a strategy.

"Game software" in the specification includes program itself and various kinds of data related to the program if necessary. It is not always necessary to relate "game software" to the data, but "game software" has always program. And, "the related various kinds of data" may be stored in a memory means, such as a ROM disc, together with the program. Furthermore, these data may be stored in an outside memory means so as to be freely read out through a communication medium means, such as the Internet.

In such kind of game software, a card game for battle with cards collected by players from many cards (so-called trading card game) is generally played. Attribution data (such as attack force and defense force) are given to many cards so as to respectively have different values, and a player can think out of various strategies concerning selection of a card from a hand for battle, thereby improving the fun of the card game.

In the above-mentioned game software, the difference of real power or the difference of a hand advantage between players maybe rather big. In this case, the result of a battle may be expected before start of the battle, so that a tension can not be given to the player and the fun of the card game may be lost.

It is possible to add an accidental element to the card game, using a dice so as not to determine the result of the battle by only difference of advantage between players. If an accidental element is merely added to the card game, but, the fun of thinking out a strategy may be lost, and therefore, the fun of the card game may be damaged.

Then, developments of the card game for improving the fun of a card game by adding an accidental element thereto without damaging the fun of thinking out a strategy have been desired.

SUMMARY OF THE INVENTION

The invention is game software having a program for getting a computer to execute a card game for determining an outcome of a battle with cards which are played by players as battle cards, the card being pulled from respective hands, comprising:
  an attribution data file for storing offense/defense data which show an attack force and a defense force and identification data for each card;
  the game software having program for getting the computer to further execute the following procedures:
  a procedure for setting hand, for determining a predetermined number of cards for each player, for reading out the identification data of the determined card, and for storing the identification data in a predetermined memory as a hand corresponding to each player;
  a procedure for selecting and determining dice card, for selecting a card to be attached to each face of a dice from the hand for each player and determining it as a dice card;
  a procedure for storing identification data of dice card, for reading the identification data of the dice card determined by the procedure for selecting and determining dice card out of the predetermined memory so as to store in the predetermined memory, relating to each face of the dice for each player;
  a procedure for controlling turn, for controlling turns between the players;
  a procedure for determining face, for determining the face of the dice to appear for the player according to a predetermined probability in the turn of the player and for reading the identification data corresponding to the determined face out of the predetermined memory;
  a procedure for controlling display of dice, for controlling to display the dice card read out by the procedure for determining face, corresponding to the identification data on the display as an appearing face of the dice for the player;
  a procedure for processing card battle, for determining the dice card read out by the procedure for determining face, corresponding to the identification data as the battle card, for reading the offense/defense data of the determined battle card out of the attribution data file, and for judging an outcome of the battle cards on the basis of the offense/defense data;
  a procedure for selecting and determining dice card to be switched, for selecting the card to be attached to the face of the dice of the player from the hand of the player, and for determining the card as the dice card; and
  a procedure for renewing identification data of dice card, for renewing the identification data corresponding to the face determined by the procedure for determining face, switching from the identification data read out by the procedure for determining face to the identification data of the dice card determined by the procedure for selecting and determining dice card to be switched.

According to this aspect of the invention, the player can freely select the card to be attached to each face of the dice from the hand although the dice card corresponding to the appearing face of the dice should be used as the battle card, so that the result of the battle can not be expected before start of the battle even if the difference of the real power or the hand advantage between the players is rather big in such a state that a strategy as to which card of the hand should be selected is secured. Then, a tension of the players can be raised without damaging the fun of thinking out a strategy, thereby raising the interest on the card game.

Besides, the invention is the game software, wherein the attribution data file stores numeral data represented by a natural number for each card, the game software has a program for getting the computer to further execute the following procedures;
  a procedure for producing and displaying board face, for producing a board face comprised of a plurality of areas where a piece corresponding to the player is located, and for displaying it on the display;
  a procedure for controlling movement of piece, for reading the numeral data of the dice card, corresponding to the identification data read out by the procedure for determining face, out of the attribution data file, for controlling to move the piece corresponding to the player on the board face, moving the number of the areas shown by the numeral data, and for displaying the movement on the display; and
  a procedure for executing procedure for processing card battle, for executing the procedure for processing card battle when locating the piece on a predetermined area by the procedure for controlling movement of piece.

According to this aspect of the invention, the piece (such as CH1) corresponding to the player is controlled to be moved the number of areas corresponding to an appearing face of a dice, and a battle with cards starts when locating the piece (such as CH1) on a predetermined area, so that it is possible to invite the player to select the card to be attached to the face of the dice according to the offense/defense data and the numeral data. Therefore, the player can think out a strategy before start of the card battle, thereby further raising the interest on the card game.

Besides, the invention is the game software, wherein the cards are classified into a plurality of offense/defense levels regarding a strength of the offense/defense data, and a numeral shown by the numeral data corresponds to the offense/defense level.

According to this aspect of the invention, the number of the areas for moving a piece (CH1 in this case) corresponds to the level of the offense/defense data. Then, the player can select the card to be attached to the face of the dice, relating both the number of the areas for moving the piece (such as CH1) and the offense/defense data to each other, thereby raising the difficulty of the strategy. So, the player having a real power is not indisposed to play even if an unexpected element is added to the card game.

Besides, the invention is the game software, wherein kinds of numerals shown by the numeral data are more than a face number (such as six faces) of the dice.

According to this aspect of the invention, kinds of numerals shown by the numeral data are more than a face number (such as six faces) of the dice, so that various developments of the game are possible without limiting the, number of the areas for moving the piece (such as CH1) to the number of the faces of the dice.

DESCRIPTION OF THE PREFERRED EMBODIMENT

Figure 1:
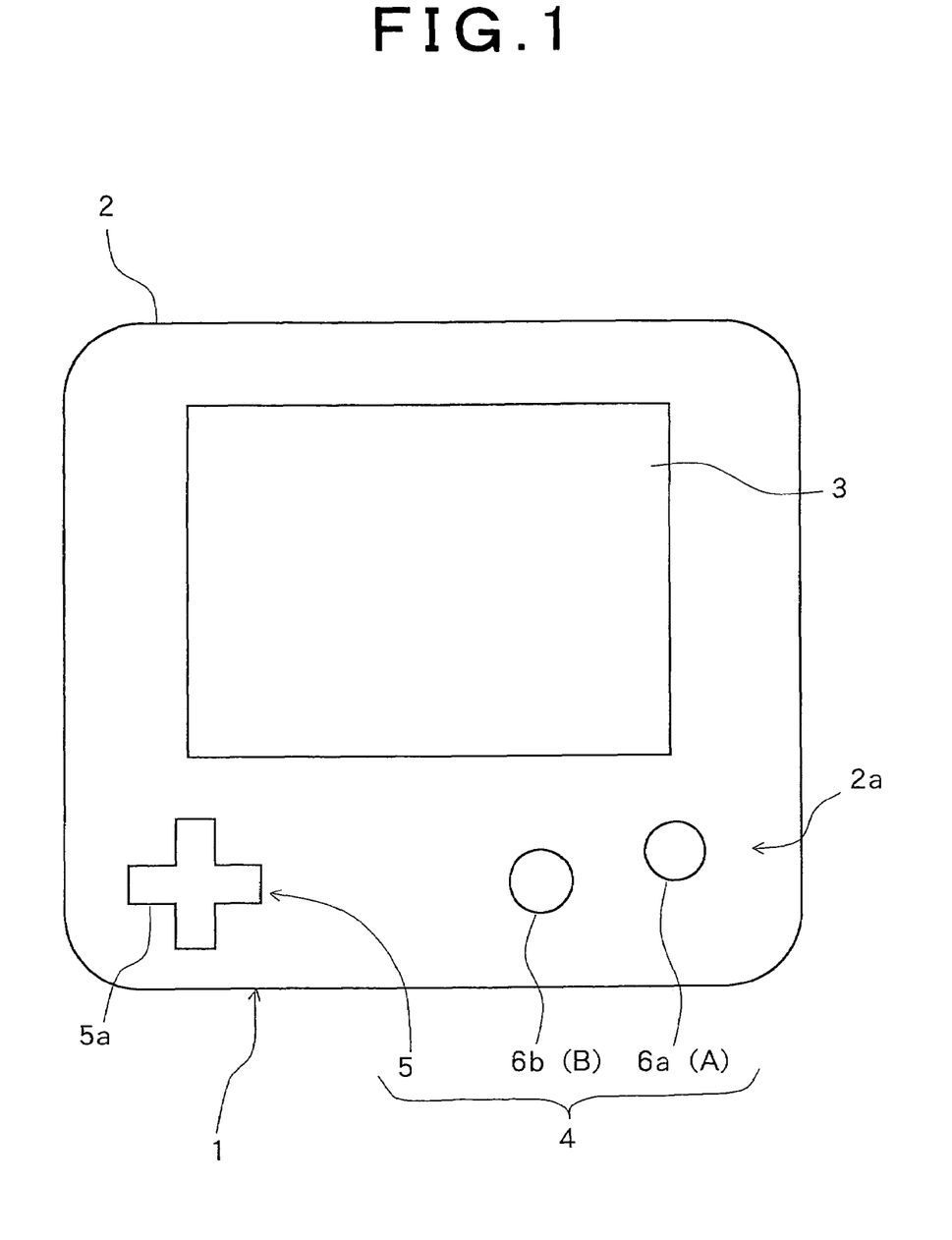
FIG. 1 is a view showing a portable game machine to which the invention is applied.

As shown in FIG. 1, a game machine 1 has a main body 2, a reflective liquid crystal display 3 attached to the main body 2 as a display unit, and an input device 4. The input device 4 has a direction indicating switch 5 and a plurality of push button switches 6a (A), 6b (B) which are provided at an operation portion 2a of a lower portion of the main body 2 in the figure. The direction indicating switch 5 has a cross type of operation member 5a and outputs a signal corresponding to each operation in up/down direction and in right/left direction of the operation member 5a (the operation of pushing down each end portion of the upper portion, the lower portion, the right portion or the left portion of the operation member).

It is not necessary to provide the operation portion 2a having various kinds of operation members, such as the direction indicating switch 5 and the push button switches 6a, 6b, and the display 3 on the same member, but the display 3 and the operation portion 2a may be separately provided. A structure of such input device 4 is well-known, so various transformations are possible. For instance, four push buttons may be located in upper and lower hands and in right and left hands, in place of the operation member 5a. The number of the push button switches 6a, 6b and their location may be changed in various forms. And, the game machine 1 is provided with a power switch, an operation member for adjusting sound volume and the like, but these are omitted.

Figure 2:
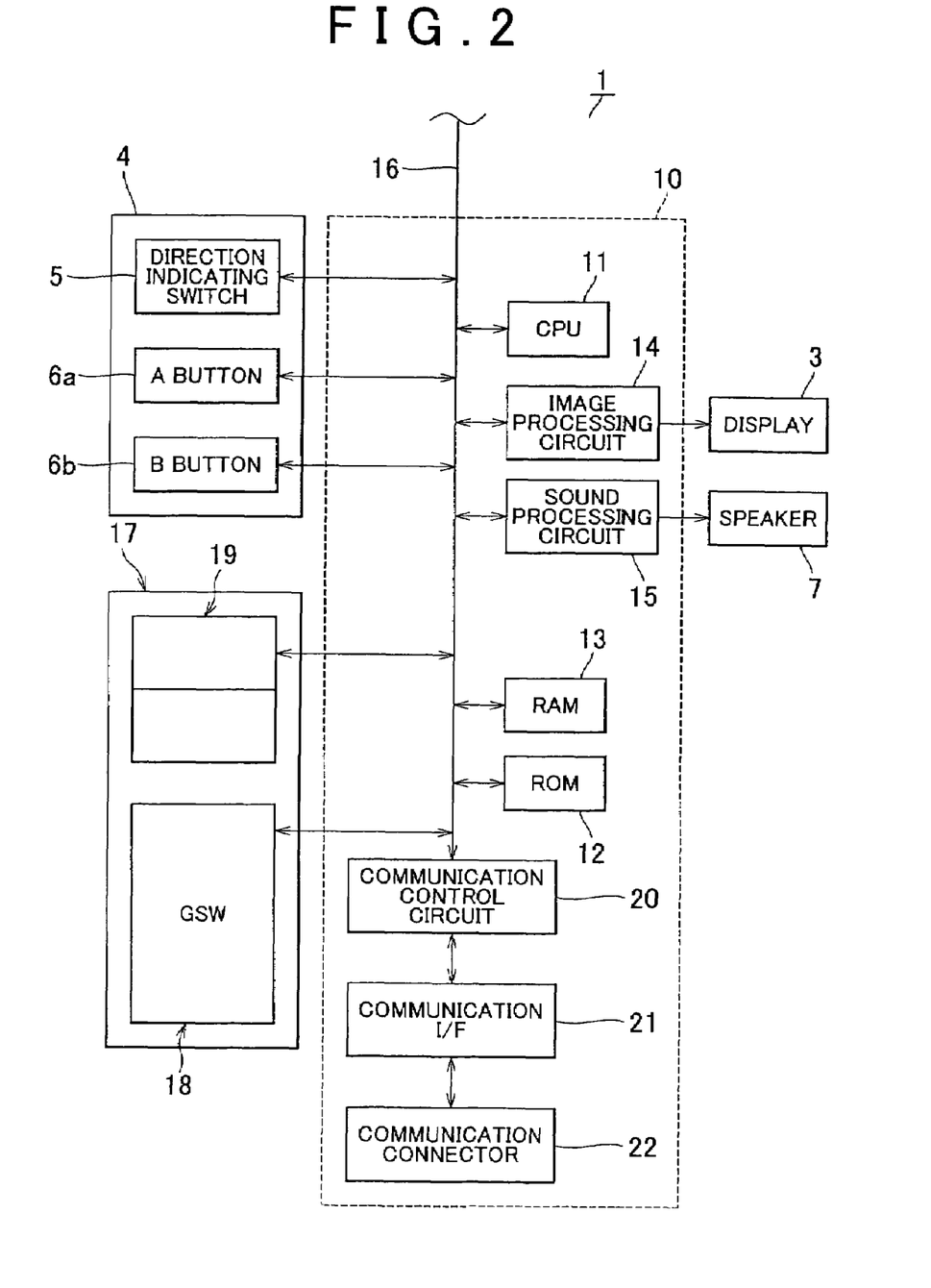
FIG. 2 is a block diagram showing a control unit of the game machine of FIG. 1.

The game machine 1 is provided with a control unit 10 (inside a dashed line), as shown in FIG. 2. The control unit 10 is a computer making use of a microprocessor, main body of which is a CPU (central processing unit) 11. A ROM 12 (read only memory) and a RAM 13 (random access memory) as main memories, an image processing circuit 14 and a sound processing circuit 15 are respectively connected with the CPU 11 through a bus 16. The display 3 is connected with the image processing circuit 14, and a speaker 7 is connected with the sound processing circuit 15.

A program necessary for basic control of the game machine 1 (booting processing, for instance) is stored in the ROM 12. A work area with respect to the CPU 11 is secured in the RAM 13. The image processing circuit 14 controls the display 3 according to a picturing instruction from the CPU 11 so as to display a predetermined image on its screen. The sound processing circuit 15 executes DA conversion on predetermined PCM (pulse coded modulation) data with predetermined sampling frequency (such as 44.1 kHz) according to a pronouncing instruction from the CPU 11 so as to output to a speaker 7 as an analogue signal.

The direction indicating switch 5, the A button 6a, the B button 6b which are provided at the input device 4 are connected with the CPU 11 through the bus 16, so that the CPU 11 can judge the state of operation of the direction indicating switch 5, the A button 6a, the B button 6b.

A communication control circuit 20 is connected with the CPU 11 through the bus 16, and a communication connector 22 is connected with the communication control circuit 20 through a communication I/F (communication interface) 21. The communication connector 22 is freely connected with a communication cable (not shown), and the CPU 11 can be connected with another game machine 1 with the peer to peer network through a communication cable. As the communication control circuit 20, one functioning as a modem or a network interface by combining a DSP (digital signal processor) and software with each other, for instance, may be utilized. The communication connector 22 and/or the communication I/F 21 may be provided as a peripheral equipment to be connected with the game machine 1 outside.

Besides, an external memory 17, which is an object separated from the control unit 10, is connected with the CPU 11 through the bus 16. The external memory 17 is a cartridge which is attachable and detachable to and from the main body 2, and a ROM (read only memory) 18 as memory medium and a RAM (random access memory) 19 as a reloadable user memory are stored therein. A game software GSW for getting the game machine 1 to function as a computer is stored in the ROM 18. The reloadable ROM, such as a flash memory, is used as the memory 19, and save data of a game, for instance, are stored in the memory 19 according to necessity.

Various storage mediums, such as a magnetic storage medium, an optical storage medium and a photoelectric magnetic storage medium, may be used as the storage medium of the external memory 17, in addition to a semiconductor storage element. Alternatively, the game software GSW is read out through another game machine 1 connected with the peer to peer network or communication medium means, such as the Internet so as to boot with no such storage medium. An interface circuit intervenes between the bus 16 and each element, if necessary, but this is not shown. Various kinds of control units 10 may be used without limiting to the above-mentioned structure.

Figure 3:
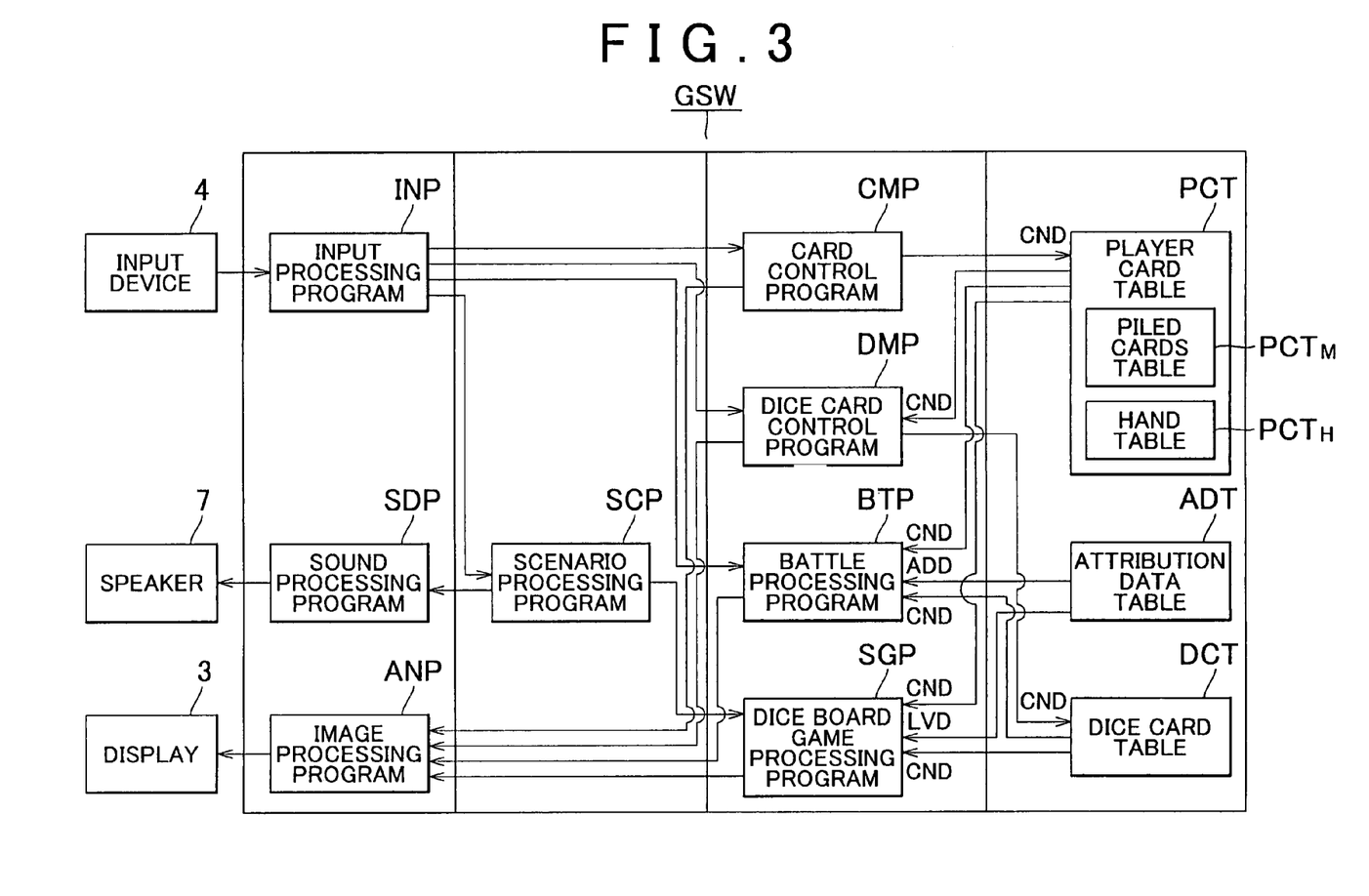
FIG. 3 is a view showing a structure of game software.

As shown in FIG. 3, the game software GSW is formed as a hierarchical structure with a plurality of modularized programs for advancing a card game.

Programs for processing a user interface, such as an input processing program INP, a sound processing program SDP and an image processing program ANP are stored in a lower hierarchy as shown in the left hand of FIG. 3. And, a scenario processing program SCP is stored in an upper hierarchy in an almost central part of the figure. Besides, programs for executing and controlling various kinds of tasks necessary for game progress, such as a card control program CMP, a dice card control program DMP, a battle processing program BTP and a dice board game processing program SGP are stored in a further upper hierarchy on the right hand of the figure.

And, data areas, such as a player card table PCT, an attribution data table ADT, a dice card table DCT, are set in an upper hierarchy on the right hand of FIG. 3. In the figure, the player card table PCT stores a piled cards table $PCT_M$ and a hand table $PCT_H$, but it is set as Null in an initial state. The dice card table DCT is also set as Null in an initial state.

Various kinds of data which are stored in the data area of the game software GSW may be stored in any form as long as the data is freely read out through the game software GSW. As the present embodiment, these data are stored in the ROM 18 or the RAM 19 of the external memory 17 (or a ROM disc) together with the program. Alternatively, these data may be stored in an outside memory means, and may be downloaded to a memory, such as the RAM 13, through a communication medium means, such as the Internet, by the read program set in the game software GSW.

A plurality of tasks produced on the basis of the respective programs CMP, DMP, . . . of the game software GSW are executed in order according to priority with a multitasking operating system (multitask OS) (not shown). The above-mentioned hierarchical structure is simply shown with only programs necessary for explaining the invention, so the real hierarchical structure is more complex and includes various kinds of programs, such as a parallel processing program. An arrow for showing an instruction or delivery of data is shown between the respective programs in order to easily understand the invention. So, how to process with a program or how to deal with data is not limited by these arrows.

In order to play a card game of the game software GSW with the game machine 1 having the above-mentioned structure, a player installs the external memory 17 on the main body 2 of the game machine 1, and powers through a power switch (not shown). After the power is on, the CPU 11 executes a predetermined initialization processing according to a program of the ROM 12, and reads the program and the data of the game software GSW which is stored in the ROM 18 of the external memory 17 so as to be stored in the RAM 13. When the player operates the input device 4 for start of the game, the CPU 11 starts various processing necessary for the card game according to the game software GSW which is stored in the RAM 13. It is not necessary to read all of the programs and the data of the game software GSW immediately after executing the initialization processing, but necessary programs and necessary data may be read at a proper time after start of the game.

The card game in this embodiment is a so-called "trading card game" for battling with cards which each player collected from huge kinds of cards (such as 1000 kinds). Various kinds of game elements may be added to the card game as long as the card game is a board game for battling with cards. An element of a dice board game is added to the card game of the present embodiment. Details are mentioned hereinafter.

A plurality of persons can simultaneously play this card game with the peer to peer network. In order to make the following explanation simple, one player plays, that is, one player battles with a player performed by the CPU 11 on the basis of a predetermined algorithm in the game software GSW. In the following explanation, the player who actually operates the input device 4 is referred to as "operation player" and the player performed by the CPU 11 is referred to as "pseudo player", and each player is referred to as only "player" if both are not necessary to be differentiated from each other.

At the time of start of the card game, the CPU 11 executes processing for setting piled cards and a hand which are necessary for a battle with cards according to the card control program CMP as shown in FIG. 3. The operation player plays the card game with the cards shown by default data described hereinafter, thereby omitting an explanation of a processing for setting the cards by collecting cards.

A card number CN is set on the cards with serial numbers (such as one (1) through a thousand (1000)), and is shown with each card number data CND. Data of necessary number of piled cards (such as forty cards) of the card number data CND are stored in a predetermined data area of the RAM 13 as default data. That is, the CPU 11 reads the card number data CND which is the default data out of a predetermined data area according to the card control program CMP so as to store in the piled cards table $PCT_M$ of the player card table PCT as shown in FIG. 3 as the piled cards for the operation player, and the piled cards for the operation player can be set, thereby.

On the other hand, the piled cards for the pseudo player are already set in the above-mentioned initialization processing in such a manner that the default data corresponding to the piled cards for the pseudo player are stored in the piled cards table $PCT_M$ of the player card table PCT of the ROM 18 of the external memory 17, being separated from the data area for the operation player.

After setting the piled cards for each player, the CPU 11 produces image data showing the piled cards for the operation player according to the image processing program ANP of FIG. 3 and displays the piled cards on the display 3, facing a common face of the card to the operation player (the card face up).

Subsequently, the CPU 11 reads the card number data CND corresponding to the piled cards for each player out of the piled cards table $PCT_M$ according to the card control program CMP, and selects the card number data CND corresponding to the cards necessary for the hand of each player (such as fifteen cards) therefrom with a proper selection method (such as at random). Then, the card number data CND is transferred from the piled cards table $PCT_M$ to the hand table $PCT_H$ so as to be stored in the data area separated from each player, thereby setting the hand for each player.

After setting the hand for each player, the CPU 11 refers to the hand table $PCT_H$, and produces image data of cards CD which respectively correspond to the card number data CND of the hand of the operation player according to the image processing program ANP. And, the fifteen cards CD which comprises the hand are displayed on the display 3, facing a text face (surface) to the operation player.

Figure 4:
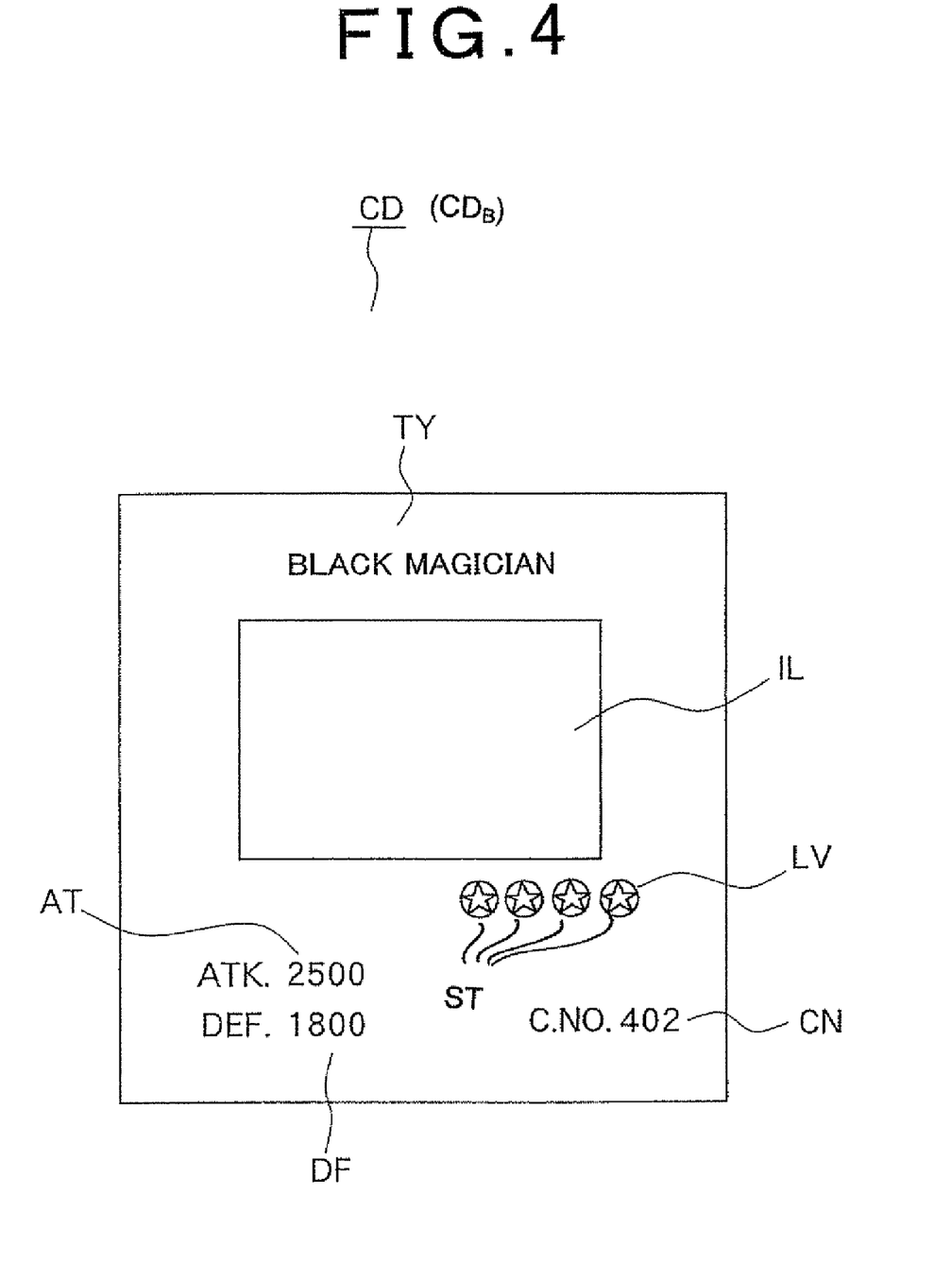
FIG. 4 is a view showing a text face of a card displayed on a display.

FIG. 4 shows a text face of the card CD which is displayed on the display 3 (only one is shown). As already mentioned, huge kinds of cards CD are prepared in advance, and the kind is characterized by the attribution data which is set for each card CD. The attribution data are offense/defense data ADD and offense/defense level data LVD.

The offense/defense data ADD show strength of the card CD with an attack force AT and a defense force DF. Concretely speaking, in the battle of the cards CD, the cards pulled from the hands are played as battle cards $CD_B$, the attack force AT and the defense force DF of the played battle cards $CD_B$ are compared with each other, so that victory is given to the battle card $CD_B$ having a bigger value. Any value from "zero (0)" to "five thousand (5000)" is given to the attack force AT and the defense force DF.

The offense/defense level data LVD show strength of the card CD with offense/defense level LV. Concretely speaking, the cards CD are classified by the offense/defense levels LV which are comprised of ten stages, into which the sum of the attack force AT and the defense forth DF is divided each one thousand "1000", and the offense/defense level LV are "10", "9", "8", . . . "1", in order starting highest level. In the battle with cards CD, various limitations are imposed on the battle card $CD_B$ of the player on an attack side having the predetermined value (such as five (5) or more) of the offense/defense level.

A title TY, such as "BLACK MAGICIAN" is shown at the text face of the card CD as shown in FIG. 4 according to the kinds of the CD, and the card number CN "402" is shown in the lower hand of the figure. An illustration IL (is not concretely shown in the figure) corresponding to the title TY is shown on the lower hand of the title TY. And, the attack force AT "2500", the defense force DF "1800", and four stars ST as the offense/defense level LV are shown on the lower hand of the illustration IL. The number of these stars ST shows the value of the offense/defense level LV. Then, the offense/defense level LV is "4".

After displaying the piled cards and the hand for the operation player on the display 3, the CPU 11 executes a process for attaching a dice card $CD_D$ (described hereinafter), which is necessary for the dice board game, according to the dice card control program DMP as shown in FIG. 3. Prior to execution of the process for attaching, the CPU 11 produces image data showing a dice, and displays a dice DC as shown in FIG. 5 on the display 3 together with the piled cards and the hand.

Figure 5:
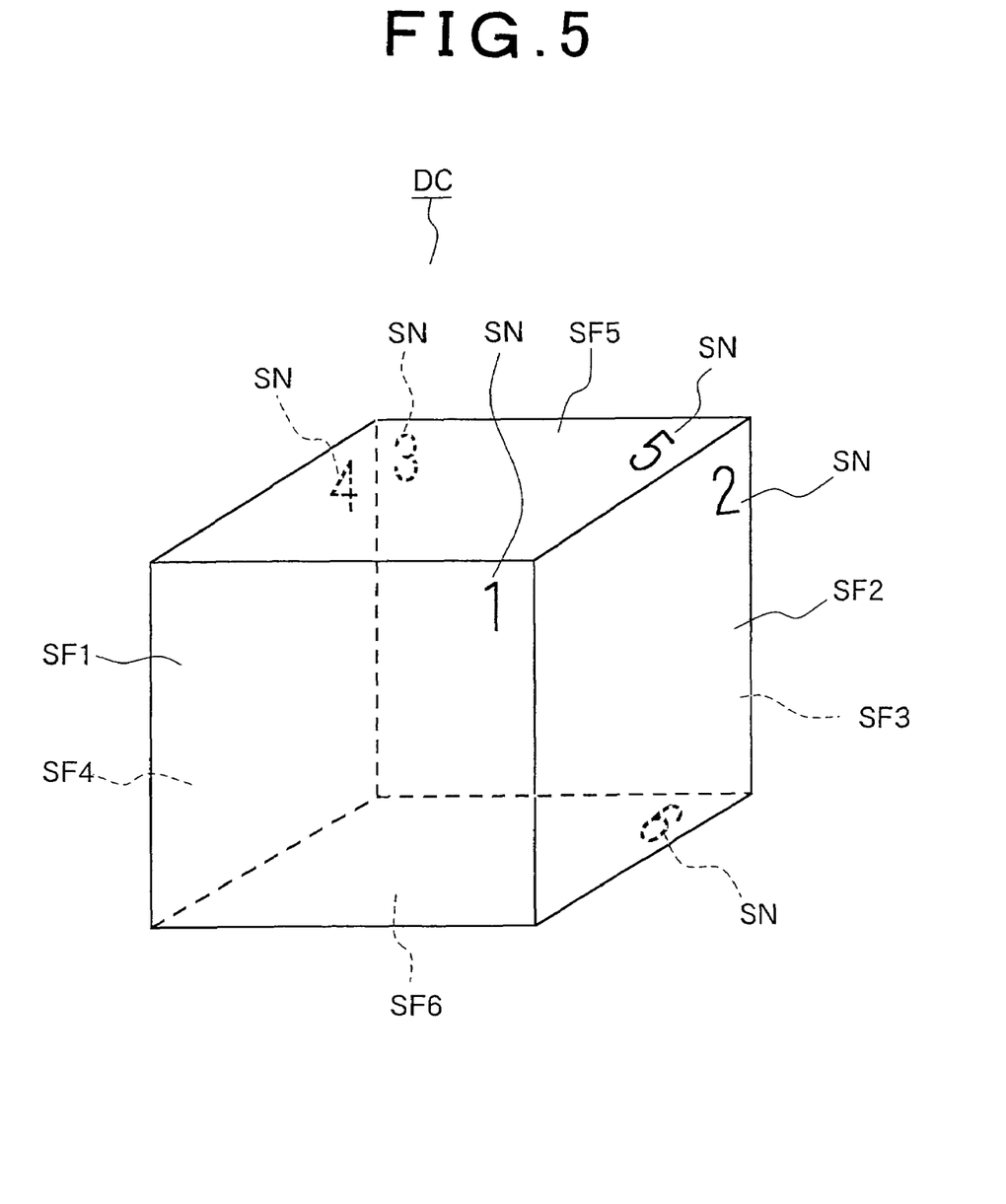
FIG. 5 is a view showing a dice displayed on the display.

FIG. 5 shows the dice DC displayed on the display 3. The dice DC is a hexahedron, and has SF1, SF2, SF3, SF4, SF5 and SF6 as six faces SF. These faces SF are blank having no pip of a dice, such as points or numerals, but a face number SN "1", "2", . . . "6" is attached to each face SF1, SF2 . . . SF6 (the face numbers SN "3", "4" and "6" on the back side of a paper are shown with a dotted line) in order to respectively identify the faces SF by the operation player.

The dice DC is not always a hexahedron as long as it is a polyhedron, but the number of faces is four or more. Besides, it is not necessary to always three-dimensionally represent the dice as long as any face SF of the dice DC can be shown as a roll. For instance, the dice can be two-dimensionally represented in such a manner that only one face SF is displayed on the display 3, switching a plurality of faces SF as a picture pattern on a reel of a slot machine. In this case, the number of the faces is two or more.

After displaying the dice DC on the display 3, the CPU 11 displays the face SF on which the card CD is scheduled to be attached by a proper display method (such as flashing representation) in order to invite the operation player to select the card CD to be attached on each face SF.

As mentioned before, an element of "dice board game" is added to the card game in the present embodiment, and the dice board game of the present card game advances according to a roll of the dice rolled by each player, similar to a general dice board game. But, the roll of the dice in this case is the value (see FIG. 4) of the offense/defense level LV of the card CD attached to each face SF of the dice DC by each player in advance ("the dice card $CD_D$" hereinafter).

If the order of attaching the card CD are faces SF1, SF2 . . . , the operation player inputs a signal for selection of the card CD to be attached on the face SF1 from the hand through the input device 4. Then, the CPU 11 refers to the hand table $PCT_H$ according to the dice card control program DMP, and reads the card number CN of the selected card CD, and determines the card CD having this card number CN as the dice card $CD_D$ corresponding to the face SF1.

Figure 6:
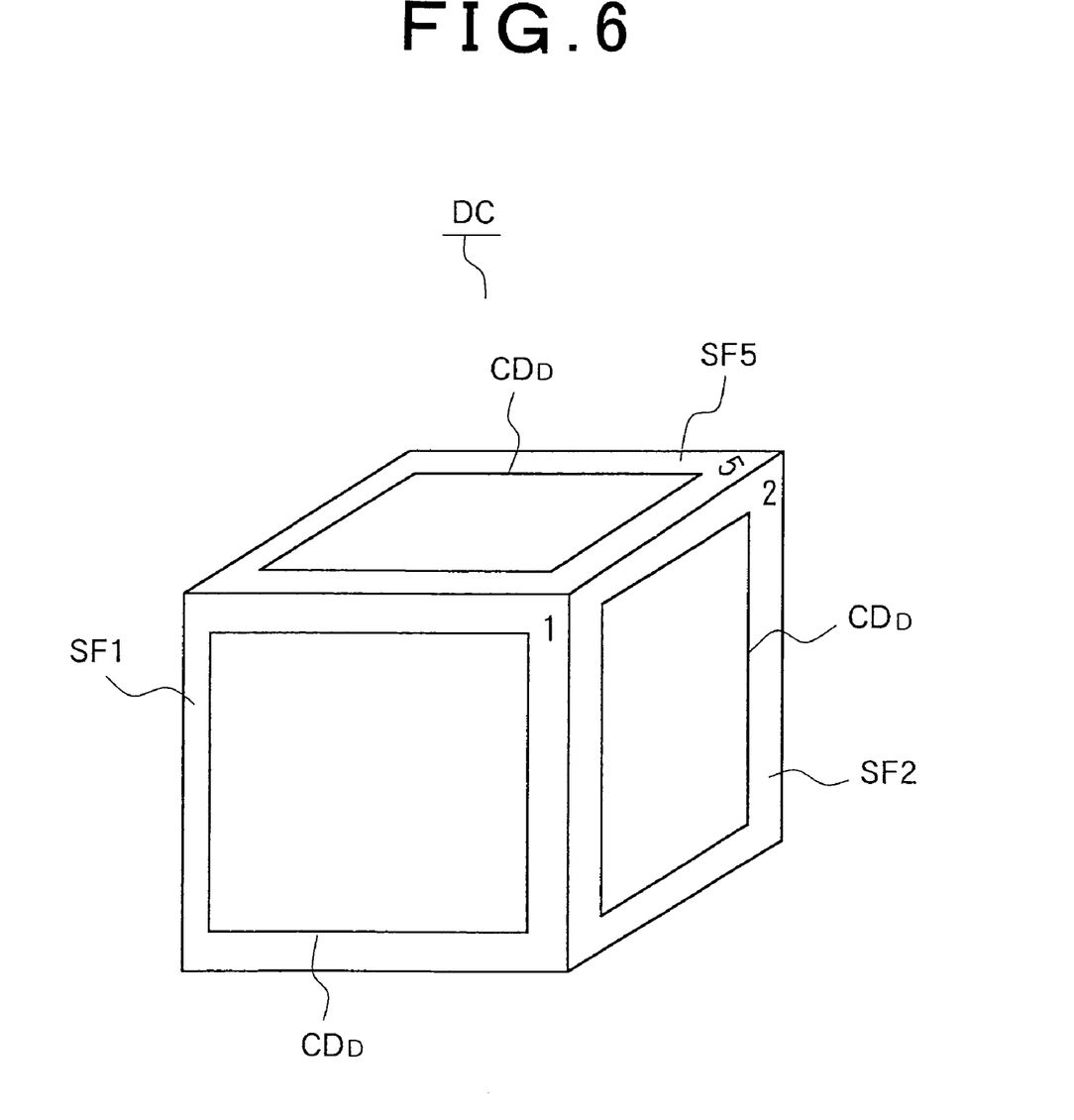
FIG. 6 is a view showing a dice attaching a dice card to each face.

If the operation player selects through the input device 4 the cards CD to be attached to the remaining respective faces SF2, SF3, . . . SF6 according to an instruction of selection of the cards CD in a way similar to the above-mentioned, the CPU 11 respectively determines the selected cards CD as the dice cards $CD_D$ corresponding to the faces SF2, SF3, . . . SF6. The dice DC as shown in FIG. 6 with the six dice cards $CD_D$ on the faces SF1, SF2 . . . SF6 is displayed on the display 3.

Figure 7:
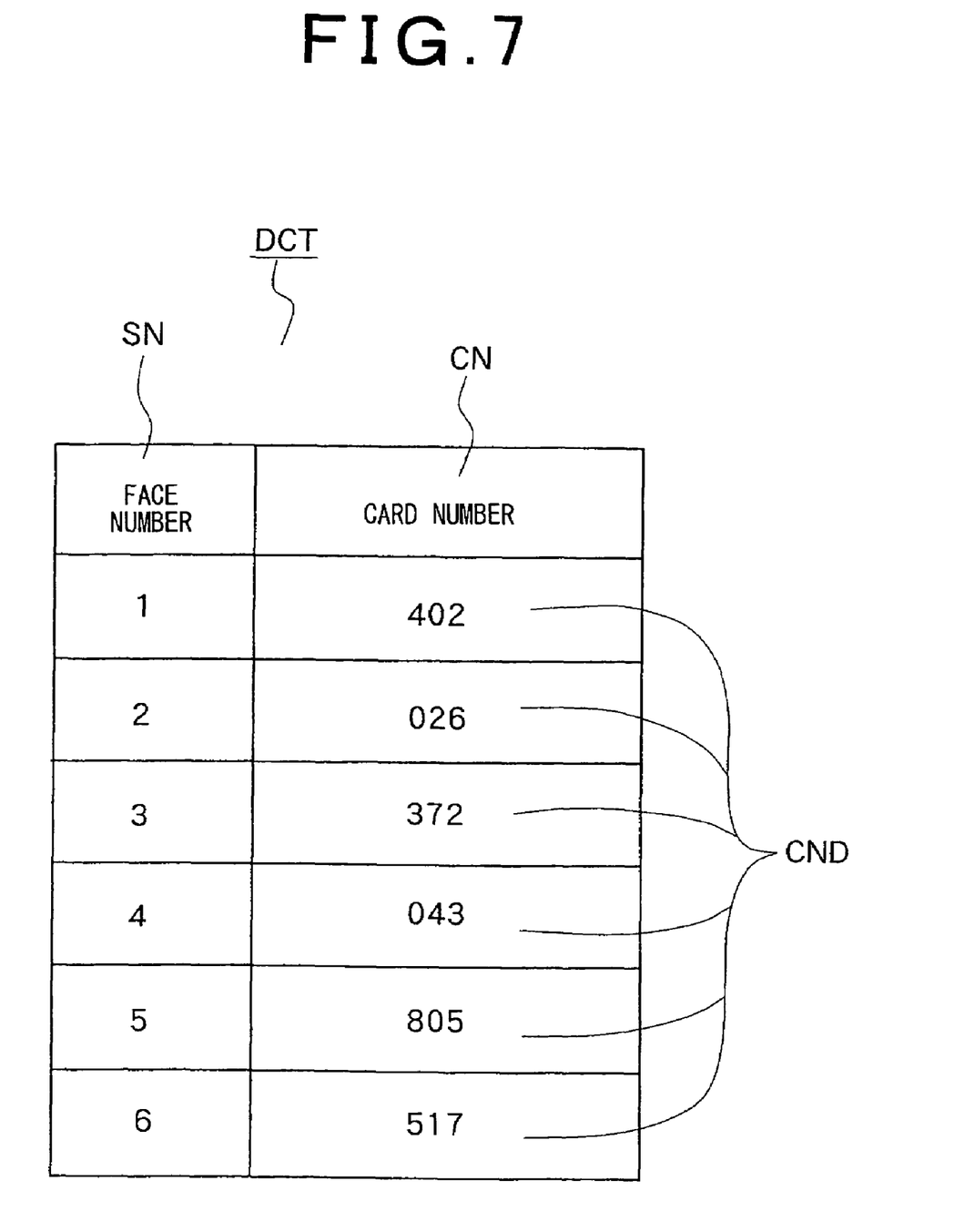
FIG. 7 a view showing contents of a dice card table.

When the dice cards $CD_D$ corresponding to the respective faces SF are determined, the CPU 11 stores the card number data CND of the determined dice cards $CD_D$ in the dice card table DCT as shown in FIG. 7 of the RAM 13 so as to correspond to the face number data SN according to the dice card control program DMP.

If the card numbers CN of the determined dice cards $CD_D$ are "402", "026", "372", "043", "805" and "517" corresponding to the faces SF1, SF2 . . . SF6, the card number data CND showing the card numbers CN "402", "026", "372", "043", "805" and "517" are stored in the dice card table DCT as shown in FIG. 7, respectively corresponding to the face numbers SN "1", "2", . . . "6".

And, the CPU 11 refers to the hand table $PCT_H$, and selects the dice cards $CD_D$ from the hand for the pseudo player and determines these cards, and stores the card number data CND which are corresponded to the face number data SN in the dice card table DCT of the RAM 13 so that the data area is separated from one for the operation player.

When finishing the process of attachment of the dice cards $CD_D$, the CPU 11 starts the card game according to a scenario of the scenario processing program SCP. In the card game, a battle with cards properly occurs during the play of the dice board game. That is, the CPU 11 firstly produces image data of a board face BD to be used for the dice board game according to the dice board game processing program SGP, and displays the board face on the display 3 as shown in FIG. 8.

Figure 8:
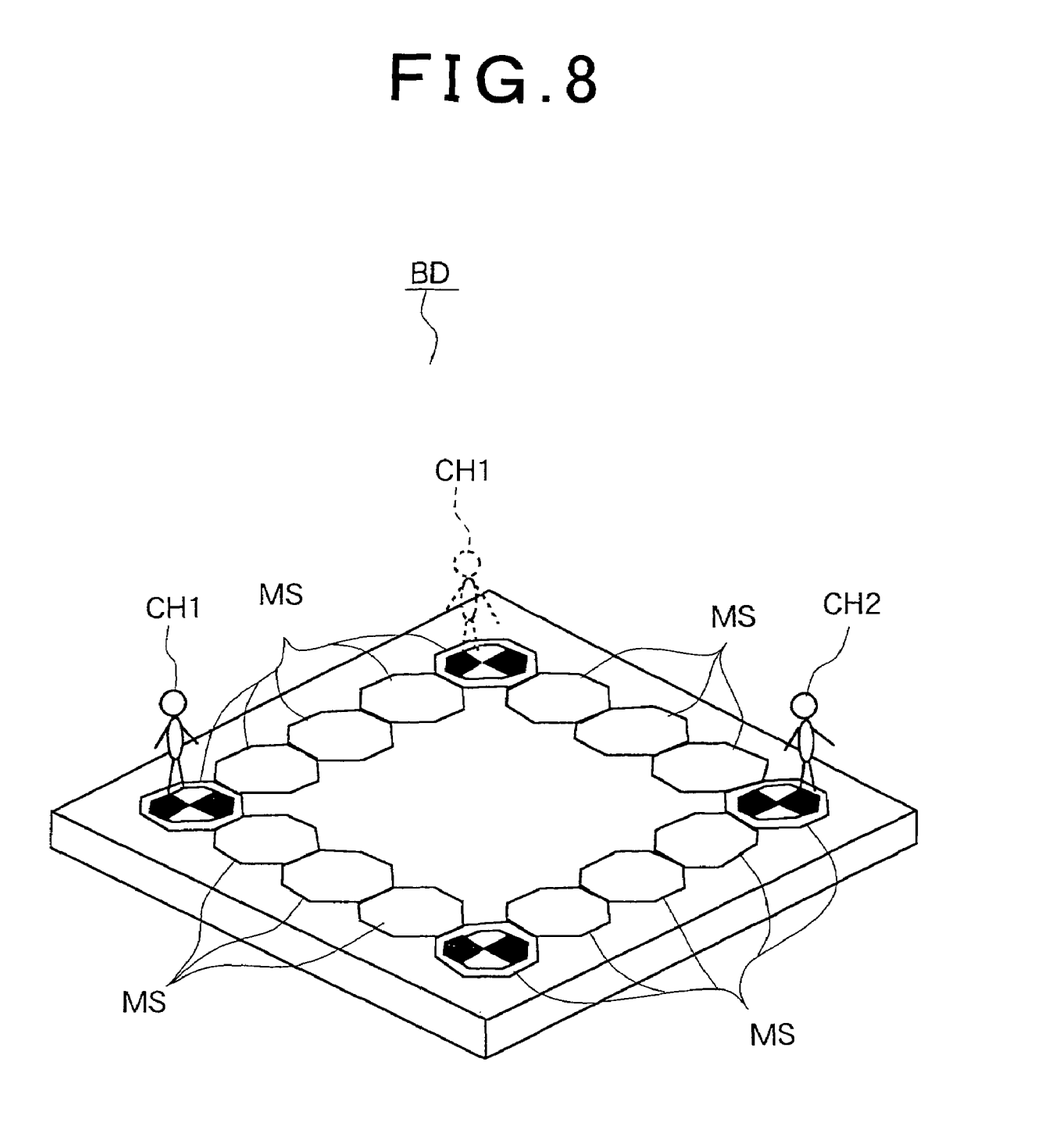
FIG. 8 is a view showing a board face displayed on the display.

FIG. 8 shows an instance of the board face BD displayed on the display 3. The board face BD is a quadrangle, and a plurality of areas MS are located on the board face BD. A number of the areas MS is sixteen, and the four areas MS of these sixteen areas are located at apical positions of the quadrangle. The areas MS which are located at the apical positions adjacent to each other are connected by the three areas MS therebetween so that these areas MS are annularly connected with each other. The whole shape of the areas MS of the board face BD as shown in FIG. 8 is an instance, and is not always annular, so it can be variously changed. And, it is not necessary to represent the area as "a frame" as shown in FIG. 8 as long as a piece can be moved thereon according to a roll of the dice.

Characters CH1, CH2, CH3 . . . to be controlled to move on the areas MS are set for each player. When the board face BD being displayed on the display 3, the CPU 11 produces image data of the respective characters CH1, CH2, and CH3 . . . according to the dice board game processing program SGP and locates these characters on each start position, as shown in FIG. 8. In order to simplify the explanation, the character CH1 of the operation player and the character CH2 of the pseudo player are only shown in the figure.

If the board face BD, where the respective characters CH1, CH2, CH3 . . . are located, is displayed on the display 3, the CPU 11 determines turns for the players by a proper method (such as a roll of the dice DC) according to the dice board game processing program SGP.

If the operation player is a precedence, the CPU 11 shows that this turn is for the operation player on the display 3 according to the image processing program ANP. The operation player inputs an instruction of rolling the dice DC through the input device 4, watching the representation of the display 3. Receiving this instruction, the CPU 11 displays the rolled dice DC on the display 3, selects any face SF from the six faces SF1, SF2, . . . SF6 with a predetermined probability, and determines the face SF as the face SF appearing after rolling the dice DC according to the dice board game processing program SGP. The probability that the face appearing after rolling the dice DC is the face SF is optional, but the probability of the respective faces SF to appear are all the same (that is, ⅙) in this embodiment.

If the face appearing after rolling the dice DC is the face SF1, the CPU 11 refers to the dice card table DCT and reads the card number data CND corresponding to the determined face SF1 according to the dice board game processing program SGP. The card number CN corresponding to the face number SN "1" is "402" as shown in FIG. 7, so that the CPU 11 reads the card number data CND showing the card number CN "402" out of the dice card table DCT.

After reading the card number data CND, the CPU 11 refers to the attribution data table ADT as shown in FIG. 3. The attribution data table ADT stores the attribution data, such as the offense/defense data ADD and the offense/defense level data LVD for each card CD, and the CPU 11 reads the offense/defense level data LVD of the card CD corresponding to the read card number data CND out of the attribution data table ADT.

As already explained with FIG. 4, the offense/defense level LV of the card CD of the card number CN "402" is "4". The dice board game advances with the value of the offense/defense level LV as "a roll" of the dice DC, as mentioned before, so that the CPU 11 controls to move the character CH1 to the fourth area on the board face BD according to the dice board game processing program SGP. For instance, the character CH1 is clockwise moved four areas when seeing the board face BD from the upper portion, and is displayed as shown in FIG. 8 (shown with a broken line).

At the same time, the CPU 11 executes a processing for removing the dice card CDD corresponding to the appearing face SF1. That is, the CPU 11 changes the card number data CND corresponding to the face number SN "1" in the dice card table DCT into Null (not shown) according to the dice card control program DMP, and renews the dice card table DCT and stores it in the RAM 13. Besides, the CPU 11 changes the dice DC by removing the dice card $CD_D$ corresponding to the face SF1 and displays the changed according to the image processing program ANP. That is, only the face SF1 appearing after rolling the dice DC is blank as shown in FIG. 5.

After changing the dice DC and displaying the changed, the turn of the operation player ends. The CPU 11 switches the turn to the pseudo player and executes the processing similar to the above-mentioned for the pseudo player according to the dice board game processing program SGP. The characters CH2, CH3 . . . of the pseudo player are controlled to be moved on the board face BD according to each offense/defense level LV, similar to the character CH1.

As the values of the offense/defense level LV, "1", "2", . . . "10" are set, so that the respective characters CH1, CH2, CH3 . . . can move the maximum ten areas although the number of faces of the dice DC is six. But, the offense/defense level LV can be divided into optional numbers of stages without limiting to the ten stages.

After one round of the turns, the CPU 11 switches the turn to the operation player, again. The CPU 11 executes processing for attaching the dice card $CD_D$ to the "blank" face SF every turn since in the second turn or later, processing for removing the dice card $CD_D$ corresponding to the appearing face SF in the last turn is executed. Besides, in the second turn or later, processing for pulling the card CD from the piled cards and for adding the card CD to the hand is executed when attaching the dice card $CD_D$. The dice DC may be used as it is without executing processing for attaching the dice card $CD_D$ until the start of the battle with the cards CD in the second turn or later.

That is, according to the card control program CMP, the CPU 11 refers to the piled cards table $PCT_M$, transfers the card number data CND of one predetermined card CD from the piled cards table $PCT_M$ to the hand table $PCT_H$, and displays on the display 3, adding the card CD as the hand. The CPU 11 displays an instruction of inviting the operation player to select the card CD to be attached on the "blank" face SF1 from the hand on the display 3 according to the dice board game processing program SGP.

As already mentioned, a battle with cards starts during playing the dice board game. In this situation, the battle with cards CD starts if the character CH1 of the operation player and the characters CH2, CH3, . . . of the pseudo player are located on the same area MS. So, the operation player selects the card CD on the basis of a strategy whether or not the battle with the pseudo player using the card CD is to be started.

If the hand of the operation player has strong cards CD (such as the card CD the attack force AT of which is high), and the operation player wants to immediately start the battle with the pseudo player, the operation player selects the card CD through which the character CH1 can be moved to the area MS where the character CH2 is located (that is, the card CD the offense/defense level LV of which is "5" if four areas intervene between the areas of both characters CH1 and CH2). On the contrary, the operation player selects the card CD excluding the above-mentioned if the operation player does not want immediate battle with the pseudo player.

When selecting the one predetermined card CD from the hand through the input device 4 by the operation player, the CPU 11 stores the card number data CND of the selected card CD in the dice card table DCT as the card number data CND corresponding to the face number SN "1", and renews and store the dice card table DCT in the RAM 13 according to the dice card control program DMP. And, the CPU 11 displays the changed dice DC having the selected card CD on the "blank" face SF1 according to the image processing program ANP. When inputting an instruction of rolling the dice CD by the operation player through the input device 4 in the above-mentioned state, the CPU 11 determines the face SF appearing after the roll and controls to move the character CH1 according to the determined face SF in a similar way to the above-mentioned.

In this way, each player rolls own dice DC in turns so as to move the characters CH1, CH2, CH3 . . . on the board face BD. If the characters CH1, CH2 are located on the same area MS, the CPU 11 executes the processing for the battle between the operation player and the pseudo player corresponding to the character CH2 according to the battle processing program BTP as shown in FIG. 3.

The CPU 11 firstly displays "a place" (not shown), where the battle cards $CD_B$ are played, changed from the board face BD which has been displayed on the display 3 according to the image processing program ANP. The piled cards and the hand of the operation player remain being displayed on the display 3.

When displaying "the place" on the display 3, the CPU 11 switches the turns between the operation player and the pseudo player who is an opponent, and both players play the battle cards on "the place", alternately according to the battle processing program BTP. At this point, the CPU 11 switches the turn to the operation player after the pseudo player plays the predetermined battle card $CD_B$ on "the place".

The CPU 11 executes the processing of pulling the card CD from the piled cards of the operation player and adding the card CD to the hand, as mentioned in the above discussion of the second turn or later. That is, the CPU 11 transfers the card number data CND of one predetermined card CD from the piled cards table $PCT_M$ to the hand table $PCT_H$, and displays the card CD added to the hand on the display 3 according to the card control program CMP.

After adding the pulled card CD to the hand, the operation player generally plays the battle card $CD_B$ on "the place". But, in the card game in the present embodiment, the battle card $CD_B$ can not be freely selected from the hand as a conventional card game, and the dice card $CD_D$ corresponding to the face SF appearing after rolling the dice DC must be used as the battle card $CD_B$.

The processing of removing the dice card CD corresponding to the appearing face SF is executed every turn, similar to the play of the dice board game, so that the card number data CND in the dice card table DCT which corresponds to the face appearing in the last turn is set as Null, and the dice DC with the "blank" face SF is displayed on the display 3 (not shown) Then, the CPU 11 invites the operation player to select the card CD to be attached to "the blank" face SF from the hand on the display 3 according to the battle processing program BTP. The dice card $CD_D$ corresponding to the face SF appearing when locating the characters CH1, CH2 on the same area MS may be used as the battle card $CD_B$.

The predetermined battle card CDB is already placed on "the place" by the pseudo player, and then the operation player judges that the card CD having the attack force AT bigger than the defense force DF of this battle card $CD_B$ should be played as the battle card $CD_B$ in order to win at the battle with this battle card $CD_B$, and selects the card CD having attack force AT the biggest in the hand through the input device 4.

Receiving this input, the CPU 11 determines the selected card CD as the dice card $CD_D$, and stores the card number data CND of the card CD in the dice card table DCT so as to correspond to the face SF appearing in the last turn, and stores the renewed dice card table DCT in the RAM 13 according to the dice card control program DMP. And, the CPU 11 displays the dice DC on the display 3, attaching the determined dice card $CD_D$ to the "blank" face SF.

If the operation player inputs an instruction of rolling the dice DC through the input device 4 in the above-mentioned state, the CPU 11 displays the rolled dice DC on the display 3, selects any face SF of the six faces SF1, SF2, . . . SF6, and determines the face SF of the dice DC to appear according to the battle processing program BTP, similar to the above-mentioned dice board game. The probability of the face SF to appear is ⅙, and the probability of the dice card $CD_D$ attached by the operation player to appear is also ⅙.

After determining the face SF of the dice DC to appear, the CPU 11 invites the operation player to input whether or not the dice card $CD_D$ corresponding to the appearing face SF is used as the battle card $CD_B$, that is, whether or not the battle is started on the display 3 according to the battle processing program BTP.

If the dice card $CD_D$ corresponding to the appearing face SF is the card CD the attack force AT of which is the biggest or the card CD having the attack force AT bigger than the defense force DF of the battle card $CD_B$ which was played by the pseudo player, the operation player inputs an instruction of starting the card battle through the input device 4 because the operation player judges the victory of the card battle.

When inputting the card battle, the CPU 11 determines the dice card $CD_D$ corresponding to the appearing face SF as the battle card $CD_B$, and displays the battle card $CD_B$ put on the "place" on the display 3, according to the battle processing program BTP. And, the CPU 11 refers to the attribution data table ADT, and reads out the offense/defense data ADD corresponding to the respective battle cards $CD_B$.

After reading out the offense/defense data ADD, the CPU 11 compares the offense/defense data ADD according to the battle processing program BTP. That is, the CPU 11 sets the player who inputted the battle start instruction as the attack side and sets the opponent as the defense side, compares the attack force AT of the battle card CDB played by the attack side and the defense force DF of the battle card $CD_B$ played by the defense side with each other, and judges the side having the bigger offense/defense data ADD to win.

In this case, the operation player is the attack side and the pseudo player is the defense side, and the attack force AT of the battle card $CD_B$ played by the operation player is bigger than the defense force DF of the battle card $CD_B$ played by the pseudo player, so that the CPU 11 judges victory of the battle card $CD_B$ on the operation player side. After judging the outcome of the card battle, the CPU 11 executes a processing for removing the dice card $CD_D$ corresponding to the appearing face SF, similar to the above-mentioned, and switches the turn to the pseudo player.

If the dice card $CD_D$ corresponding to the appearing face SF is the card CD having the attack force AT smaller than the defense force DF of the battle card $CD_B$ played by the pseudo player, the operation player judges defeat of the card battle, thereby instructing not to start the card battle through the input device 4. Then, the CPU 11 executes a processing for removing the dice card $CD_D$ corresponding to the appearing face SF without executing processing of reading out the attribution data and of judging the result of the battle, and switches the turn to the pseudo player.

Various kinds of methods of controlling such a battle can be taken, and the battle may always start after the characters CH1 and CH2 of the players on both attack and defense sides are located on the same area MS even if the instruction of starting is not inputted.

The operation player can freely select the card CD to be attached to each face SF of the dice DC from the hand in the game software GSW according to the present invention although the dice card $CD_D$ corresponding to the appearing face SF of the dice DC should be used as the battle card $CD_D$, so that an unexpected element due to a roll of the dice DC can be added to the card game in such a state that a strategy as to which card CD of the hand should be selected is secured. Then, the result of the battle can not be expected before start of the battle even if one player has bigger real power or has a bigger hand advantage than another player, and a fun of thinking out a strategy can be given to the players and a tension of the players can be raised, thereby improving the fun of the card game.

And, the card CD is attached to each face SF of the dice DC during playing the dice board game, so that the operation player can think out a strategy during the dice board game (that is, before the card battle), taking the number of areas for moving the character CH1 and the future card battle into consideration, thereby further increasing the interest on the card game.

Furthermore, the value of the offense/defense level LV shows the number of areas for moving the character CH1, and a level of the strength of the card CD (the offense/defense data ADD), so that the operation player can select the card CD to be attached to the dice DC, relating the number of the areas for moving the character CH1 and the offense/defense data ADD to each other, thereby raising the difficulty of thinking out a strategy. Therefore, the player having a real power is not indisposed to play even if an unexpected element is added to the card game. The offense/defense level LV are "10", "9", "8" . . . "1" in the order of the highest level of the strength of the card CD, but may be oppositely set.

As mentioned before, the players play the card game in such away that the respective players alternately pull the card CD from the hand, and select the card CD according to each strategy as the battle card $CD_B$. A given point is set on each player as a default value. The CPU 11 adds a point according to the result of the comparison of the offense/defense data ADD (such as the difference of the compared offense/defense data ADD) to the given point of a gainer side and subtracts this point from the given point of a loser side according to the battle processing program BTP.

If the given point on the pseudo player side is zero "0" or lower after repeating the card battles, the CPU 11 removes the character CH2 of the pseudo player which is a loser from a character table (not shown) which is stored in a predetermined data area in the RAM 13 according to the battle processing program BTP, and the above-mentioned battle processing ends. And, the CPU 11 switches "the place" which has been displayed on the display 3 to the board face BD, again according to the dice board game processing program SGP, and resumes the play of dice board game. Then, the battle with cards between the operation player and another pseudo player starts during the playing of the dice board game in a similar way to the above-mentioned.

The above-mentioned embodiment of the present invention has been explained as the game software GSW, but the present invention may be applied to another one, such as a game machine, as long as it has software comprised of various kinds of programs INF, SDP . . . of the game software GSW and hardware for working the software.

The game machine of the present embodiment is the portable game machine 1 as shown in FIG. 1, but the present invention can be also applied to a game machine for home use and a game machine for an arcade, and a mobile phone, a PDA (personal digital assistant), a personal computer which are not used for a game, as the game machine.

Besides, the present invention can be applied to the game software for card game, and applied to a portable game machine, a game machine for home use and a game machine for an arcade, a mobile phone, a PDA (personal digital assistant), a personal computer as the hardware.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A game program embodied in a computer readable medium having a program for getting a computer to execute a card game for determining an outcome of a battle with cards which are played by players as battle cards, said card being pulled from respective hands, comprising:

an attribution data file for storing offense/defense data which show an attack force and a defense force and identification data for each said card;

said game program having program for getting said computer to further execute the following procedures:

a procedure for setting hand, for determining a predetermined number of cards for each said player, for reading said identification data of said determined card out of a piled cards table for storing said identification data of said card of piled cards, and for storing said identification data in a predetermined memory as a hand corresponding to each said player;

a procedure for selecting and determining dice card, for determining said card selected from said hand of each said player as a dice card to be located on each face of a dice;

a procedure for storing identification data of dice card, for reading said identification data of said dice card determined by said procedure for selecting and determining dice card out of said predetermined memory so as to store in said predetermined memory, relating to said each face of said dice for each said player;

a procedure for controlling turn, for controlling turns between said players;

a procedure for determining face, for determining said face of said dice to appear for said player according to a predetermined probability in said turn of said player and for reading said identification data corresponding to said determined face out of said predetermined memory;

a procedure for controlling display of dice, for controlling to display said dice card read out by said procedure for determining face, corresponding to said identification data on said display as an appearing face of said dice for said player;

a procedure for processing card battle, for determining said dice card read out by said procedure for determining face, corresponding to said identification data as said battle card, for reading said offense/defense data of said determined battle card out of said attribution data file, and for judging an outcome of said battle cards on the basis of said offense/defense data;

a procedure for selecting and determining dice card to be switched, for determining said card newly selected from said hand for said player as said dice card to be located on said face of said dice for said player so as to be switched from said card which has been located on said face of said dice; and a procedure for renewing identification data of dice card, for renewing said identification data in said predetermined memory corresponding to said face determined by said procedure for determining face, switching from said identification data read out by said procedure for determining face to said identification data of said dice card determined by said procedure for selecting and determining dice card to be switched.

2. The game program embodied in a computer readable medium according to claim 1, wherein said attribution data file stores numeral data represented by a natural number for each said card, said game program has a program for getting said computer to further execute the following procedures;

a procedure for producing and displaying board face, for producing a board face comprised of a plurality of areas where a piece corresponding to said player is located, and for displaying said board face on said display;

a procedure for controlling movement of piece, for reading said numeral data of said dice card, corresponding to said identification data read out by said procedure for determining face, out of said attribution data file, for controlling to move said piece corresponding to said player on said board face, moving the number of said areas shown by said numeral data, and for displaying said movement on said display; and a procedure for executing procedure for processing card battle, for executing said procedure for processing card battle when locating said piece on a predetermined area by said procedure for controlling movement of piece.

3. The game program embodied in a computer readable medium according to claim 2, wherein said cards are classified into a plurality of offense/defense levels regarding a strength of said offense/defense data, and a numeral shown by said numeral data corresponds to said offense/defense level.

4. The game program embodied in a computer readable medium according to claim 2, wherein kinds of numerals shown by said numeral data are more than a face number of said dice.

5. A game machine for executing a card game for determining an outcome of a battle with cards which are played by players as battle cards, said card being pulled from respective hands, comprising:

an attribution data file for storing offense/defense data which show an attack force and a defense force and identification data for each said card;

means for setting hand, for determining a predetermined number of cards for each said player, for reading said identification data of said determined card out of a piled cards table for storing said identification data of said card of piled cards, and for storing said identification data in a predetermined memory as a hand corresponding to each said player;

means for selecting and determining dice card, for determining said card selected from said hand of each said player as a dice card to be located on each face of a dice;

means for storing identification data of dice card, for reading said identification data of said dice card determined by said means for selecting and determining dice card out of said predetermined memory so as to store in said predetermined memory, relating to said each face of said dice for each said player;

means for controlling turn, for controlling turns between said players;

means for determining face, for determining said face of said dice to appear for said player according to a predetermined probability in said turn of said player and for reading said identification data corresponding to said determined face out of said predetermined memory;

means for controlling display of dice, for controlling to display said dice card read out by said procedure for determining face, corresponding to said identification data on said display as an appearing face of said dice for said player;

means for processing card battle, for determining said dice card read out by said procedure for determining face, corresponding to said identification data as said battle card, for reading said offense/defense data of said determined battle card out of said attribution data file, and for judging an outcome of said battle cards on the basis of said offense/defense data;

means for selecting and determining dice card to be switched, for determining said card newly selected from said hand for said player as said dice card to be located on said face of said dice for said player so as to be switched from said card which has been located on said face of said dice; and means for renewing identification data of dice card, for renewing said identification data in said predetermined memory corresponding to said face determined by said means for determining face, switching from said identification data read out by said means for determining face to said identification data of said dice card determined by said means for selecting and determining dice card to be switched.

6. A game machine for executing a card game for determining an outcome of a battle with cards which are played by players as battle cards, said card being pulled from respective hands, comprising:

an attribution data file for storing offense/defense data which show an attack force and a defense force and identification data for each said card;

a unit for setting hand, for determining a predetermined number of cards for each said player, for reading said identification data of said determined card out of a piled cards table for storing said identification data of said card of piled cards, and for storing said identification data in a predetermined memory as a hand corresponding to each said player;

a unit for selecting and determining dice card, for determining said card selected from said hand of each said player as a dice card to be located on each face of a dice;

a unit for storing identification data of dice card, for reading said identification data of said dice card determined by said unit for selecting and determining dice card out of said predetermined memory so as to store in said predetermined memory, relating to said each face of said dice for each said player;

a unit for controlling turn, for controlling turns between said players;

a unit for determining face, for determining said face of said dice to appear for said player according to a predetermined probability in said turn of said player and for reading said identification data corresponding to said determined face out of said predetermined memory;

a unit for controlling display of dice, for controlling to display said dice card read out by said unit for determining face, corresponding to said identification data on said display as an appearing face of said dice for said player;

a unit for processing card battle, for determining said dice card read out by said unit for determining face, corresponding to said identification data as said battle card, for reading said offense/defense data of said determined battle card out of said attribution data file, and for judging an outcome of said battle cards on the basis of said offense/defense data;

a unit for selecting and determining dice card to be switched, for determining said card newly selected from said hand for said player as said dice card to be located on said face of said dice for said player so as to be switched from said card which has been located on said face of said dice; and a unit for renewing identification data of dice card, for renewing said identification data in said predetermined memory corresponding to said face determined by said unit for determining face, switching from said identification data read out by said unit for determining face to said identification data of said dice card determined by said unit for selecting and determining dice card to be switched.

* * * * *